(12) United States Patent
Buttell et al.

(10) Patent No.: US 8,127,795 B2
(45) Date of Patent: Mar. 6, 2012

(54) FLUE GAS DIVERTER DAMPER SEAL LAND

(75) Inventors: John T. Buttell, Pickering (CA); Edward P. Chan, Guelph (CA); Donald Robert Gabriel, New Gloucester, ME (US); Zhen Hu, Waterloo (CA); Zoran Nikodinoski, Cambridge (CA)

(73) Assignee: Atco Structures & Logistics Ltd., Calgary (CA)

( * ) Notice: Subject to any disclaimer, the term of this patent is extended or adjusted under 35 U.S.C. 154(b) by 0 days.

(21) Appl. No.: 12/638,808

(22) Filed: Dec. 15, 2009

(65) Prior Publication Data

US 2011/0140372 A1   Jun. 16, 2011

(51) Int. Cl.
*F16K 11/052* (2006.01)

(52) U.S. Cl. ............ 137/875; 137/246.22; 251/210

(58) Field of Classification Search .......... 137/246, 137/246.22, 625.44, 845; 251/210
See application file for complete search history.

(56) References Cited

U.S. PATENT DOCUMENTS

| | | | | |
|---|---|---|---|---|
| 4,077,432 A | * | 3/1978 | Herr | 137/601.06 |
| 4,239,061 A | * | 12/1980 | Peterson | 137/614.11 |
| 4,351,361 A | * | 9/1982 | Worley | 137/625.44 |
| 4,383,693 A | * | 5/1983 | Heller | 277/606 |
| 4,821,507 A | | 4/1989 | Bachmann et al. | |
| 4,919,169 A | | 4/1990 | Bachmann et al. | |
| 5,120,021 A | | 6/1992 | Squirrell et al. | |
| 5,159,954 A | * | 11/1992 | Janich | 137/557 |
| 5,186,205 A | | 2/1993 | Bachmann | |
| 5,329,970 A | | 7/1994 | Squirrell | |
| 7,290,566 B1 | | 11/2007 | Young et al. | |

* cited by examiner

*Primary Examiner* — John Fox
(74) *Attorney, Agent, or Firm* — Bennett Jones LLP

(57) ABSTRACT

A diverter damper seal land for installation in a flue gas duct defined by a casing wall, the diverter damper seal land includes: a front seal land and a rear seal land, the front seal land is mountable in the duct by a connection between the base edge and the casing wall and the rear seal land is connected at its base edge to the inner edge of the front seal land and spaced back and radially inwardly from the front seal such that it protrudes radially inwardly behind the front seal land. Another diverter damper seal land assembly includes: a seal land including a front seal land and a rear seal land; a first gusset; and a second gusset spaced from the first gusset, the first and second gussets connected to the casing wall and positioned at the back side of the front seal land to support the seal land in an operative position in the duct.

12 Claims, 5 Drawing Sheets

FLUE GAS DIVERTER DAMPER SEAL LAND

FIELD

The invention relates to a flue gas diverter damper seal land and, in particular, a flue gas diverter damper seal land for a combined cycle gas turbine installation.

BACKGROUND

A combined cycle gas turbine plant includes both a bypass stack and a heat exchanger. Diverter dampers are used in combined cycle gas turbine plants to divert the gas turbine exhaust gas either up the bypass stack or into the heat exchanger, for example, for heat recovery steam generation. Generally, in a gas turbine generator that has operability in a "combined cycle" mode, sometimes flue gas from the turbine is passed through a heat recovery steam generator (HRSG) and sometimes the flue gas is passed up a flue bypass stack, instead of passing though the HRSG. At the junction between these two flue gas paths, the diverter damper is movable between two positions, the first position wherein the damper is sealed against a seal land in a flow path leading to the HRSG and the second position wherein the damper is sealed against a seal land in a flow path leading to the stack. For reasons of worker safety, environmental protection, system control and energy efficiency, a diverter damper is needed that seals against a seal land to provide substantially complete isolation of the bypass stack from the heat exchanger.

Diverter Dampers may be used in applications other than gas turbine plants, wherever hot flue gases need to be routed from one port to another using a diverter damper blade for isolation of one port.

Generally, the diverter damper includes a door, called a blade. The blade includes a perimeter seal formed by two spaced apart blade seals. Each blade seal extends out from the perimeter of the blade, with one blade seal spaced behind the other. The blade fits into and seals the outlet port to the bypass stack in one position and can be moved into a second position to fit into and seal the outlet port to the heat exchanger. When positioned in either of the outlet ports, the blade seals seat against a seal land around the perimeter of the outlet port. Each seal land presents two sealing surfaces positioned to seal the two spaced apart blade seals. As such, a cavity is formed between the first contacting blade seal and seal land and the second contacting blade seal and seal land. Ambient air is blown into the cavity to create positive pressure and providing a secondary seal that insulates turbine exhaust from passing the diverter damper blade.

The seal land, when no damper blade is sealed against it, is open in the flue gas path and, thereby, exposed to considerable thermal and aerodynamic forces. Also, the force of the blade bearing against the seal land may also sometimes be considerable. Previously known seal lands were, therefore, often prone to deterioration and deformation, due to blade overpressure or by thermal expansion. Also, the form of previous seal lands tended to convey considerable heat outwardly to the outer casing of the turbine flue gas exhaust conduit causing paint blistering and corrosion on the outer visible housing of the gas turbine and, more importantly, a hazard to personnel passing or working thereby.

SUMMARY

In accordance with a broad aspect of the present invention there is provided a gas turbine diverter damper seal land comprising: a front seal land having a length, an outer edge extending along its length and an inner edge extending along its length spaced from the outer edge and defining an elongate front sealing surface on its front side between the outer edge and the inner edge; and a rear seal land having a length, a base edge extending along its length and an opposite edge extending along its length spaced from the base edge and defining an elongate rear sealing surface on its front side between the base edge and the opposite edge. The front seal land mountable in the duct by a connection between the outer edge and the casing wall and the rear seal land being connected at its base edge to the inner edge of the front seal land and spaced back and radially inwardly from the front seal such that it protrudes radially inwardly behind the front seal land.

In accordance with another broad aspect of the present invention, there is provided a gas turbine diverter damper seal land comprising: seal land including: a front seal land having a length, an outer edge extending along its length and an inner edge extending along its length spaced from the outer edge and defining an elongate front sealing surface on its front side between the outer edge and the inner edge; and a rear seal land having a length, a base edge extending along its length and an opposite edge extending along its length spaced from the base edge and defining an elongate rear sealing surface on its front side between the base edge and the opposite edge. The front seal land mountable in the duct by a connection to the casing wall and the rear seal land being connected at its base edge to the inner edge of the front seal land and spaced back and radially inwardly from the front seal such that it protrudes radially inwardly behind the front seal land; and a connector for connecting the front seal land to the casing wall.

In accordance with yet another broad aspect of the present invention, there is provided a gas turbine diverter damper seal land comprising: a seal land including a front seal land having a length, an outer edge extending along its length and an inner edge extending along its length spaced from the outer edge and defining an elongate front sealing surface on its front side between the outer edge and the inner edge and a back side on a surface opposite the elongate front sealing surface and a rear seal land having a length, a base edge extending along its length and an opposite edge extending along its length spaced from the base edge and defining an elongate rear sealing surface on its front side between the base edge and the opposite edge. Further, a first gusset; and a second gusset spaced from the first gusset, the first and second gussets connected to the casing wall and each extending substantially perpendicularly relative to the length of the front seal land from the back side of the front seal land to support the seal land in an operative position in the duct.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive. The invention is not limited in use to combined cycle power plant but may be used in any environment where hot flue gases are diverted from one conduit to another where a tight seal is required.

BRIEF DESCRIPTION OF DRAWINGS

Referring to the drawings wherein like reference numerals indicate similar parts throughout the several views, several aspects of the present invention are illustrated by way of example, and not by way of limitation, in detail in the figures, wherein.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
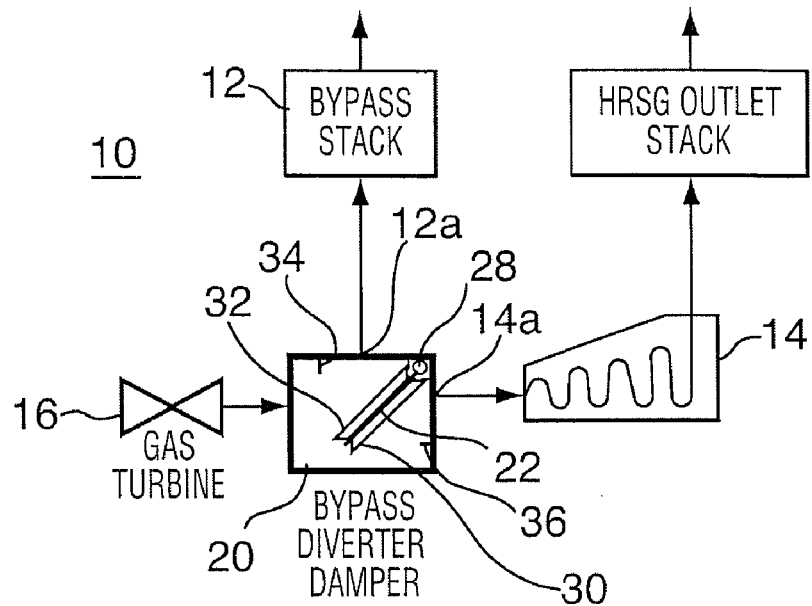
FIG. 1 is a schematic illustration of a typical installation of a diverter damper in the flue gas conduit connecting the gas turbine to the bypass stack and the heat exchanger (HRSG).
Figure 2:
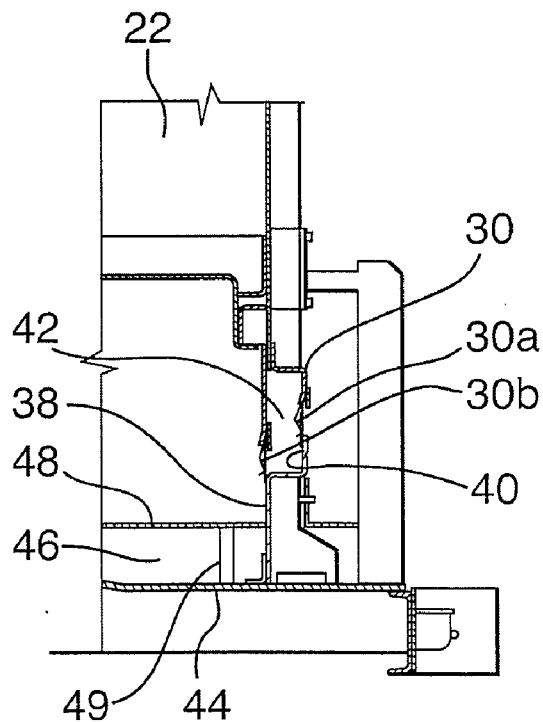
FIG. 2 is an enlarged schematic illustration of a flue gas diverter damper installation.
Figure 3:
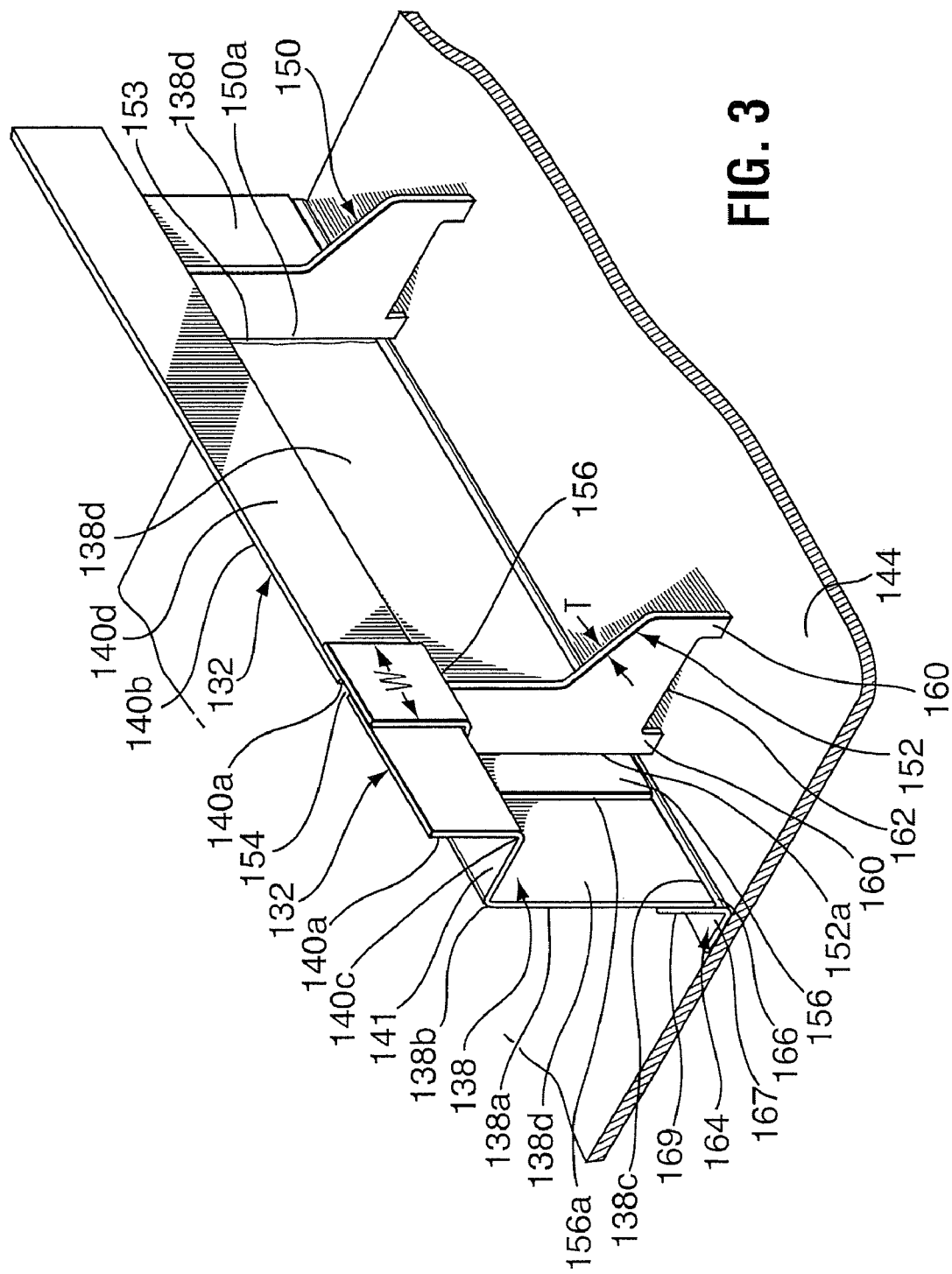
FIG. 3 is rear perspective view of a portion of the new seal land.
Figure 4:
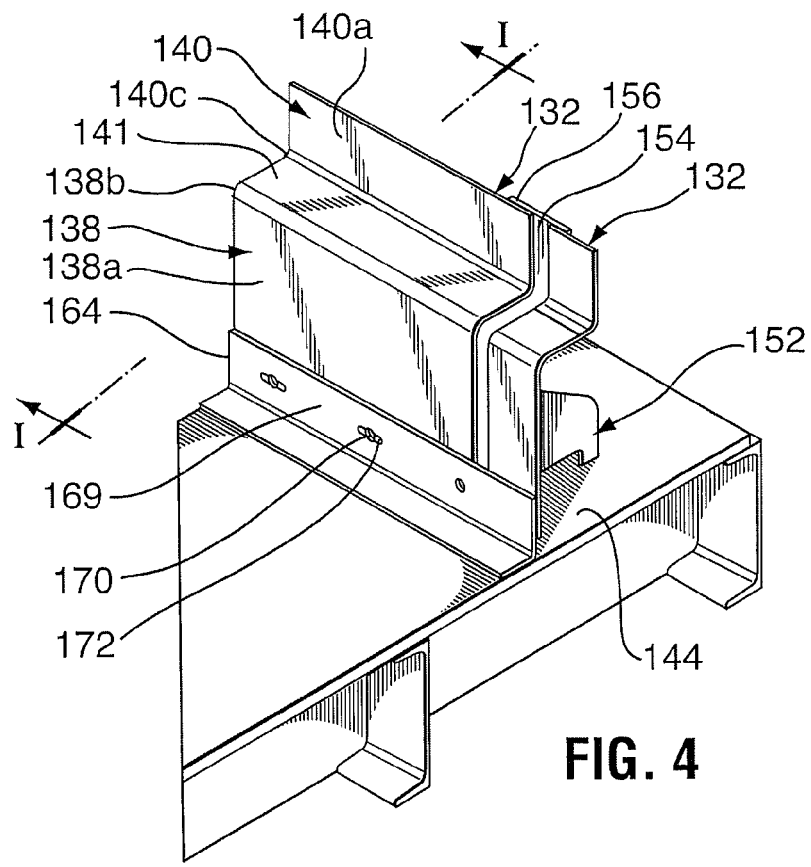
FIG. 4 is front perspective view of a portion of the new seal land.

Referring to FIGS. 1 and 2, a combined cycle gas turbine installation 10 includes both a bypass stack 12 and a heat exchanger 14 that can accept flue gas from the gas turbine 16. In the illustrated embodiment, heat exchanger 14 is a heat recovery steam generator. A diverter damper installation is used in the flue gas exhaust conduit 20 to divert the gas turbine exhaust gas either up the bypass stack or into the heat exchanger. A diverter damper includes a damper blade 22 that seals against a pair of perimeter seal lands 34, 36 to provide substantially complete isolation of the bypass stack and the heat exchanger, respectively. Generally, blade 22 is moveable, for example, by a pivotal connection 28 to block flue gas passage either to the stack or to the heat exchanger. In particular, the blade acts in the junction between the turbine exhaust outlet port, a bypass stack inlet port 12a and a heat exchanger inlet port 14a. In one position the blade fits into and seals inlet port 12a to the bypass stack and can be moved into a second position to fit into and seal inlet port 14a to the heat exchanger.

As is typical, the blade includes a perimeter seal 30, 32 on each side thereof. At least one such seal and possibly each perimeter seal is formed by two spaced apart blade seals 30a, 30b. Each blade seal extends about the perimeter of the blade, with one blade seal, termed herein the leading blade seal 30a, spaced in front of the other, termed herein the trailing blade seal 30b, about the entire perimeter of the blade. The trailing blade seal 30b may have a length greater than the length of the leading blade seal, such that trailing blade seal 30b protrudes radially outwardly beyond leading blade seal 30a when viewed in plan. When positioned in either of the outlet ports, the blade seals seat and seal against a seal land surrounding the outlet port. For example, there is a bypass stack seal land 34 positioned in, and about the periphery of, outlet port 12a to the bypass stack and a heat exchanger seal land 36 positioned in, and about the periphery of, outlet port 14a to the heat exchanger.

Each seal land includes two sealing surfaces positioned to seal the two spaced apart blade seals. In particular, with reference to seal land 36, a front sealing surface 38 accepts sealing thereagainst of trailing blade seal 30b and a rear sealing surface 40 accepts sealing thereagainst of leading blade seal 30a. Herein front sealing surface is considered the surface adjacent the gas turbine and in particular the first seal surface that flue gas would pass, while the rear sealing surface is positioned beyond the front seal surface, when considering the direction of the flow of the flue gas.

Front sealing surface 38 and rear sealing surface 40 may be spaced apart to correspond to the spacing of the blade seals that are intended to seat thereagainst. In addition, rear sealing surface may protrude inwardly into the port beyond the front sealing surface 38 to be accessible for presenting a surface to accept the leading blade seal 30a. When the damper blade is in a sealing position against the seal land, a cavity 42 is formed between seal created by the leading blade seal and the rear seal land, and the seal created by the trailing blade seal and the front seal land. Cavity 42 and the dual seal set up provides a seal chamber around the perimeter of the blade where ambient seal air is blown in to seal and prevents turbine exhaust gases from passing the diverter damper blade into the downstream port.

The seal land is installed within an outer casing 44 that separates and contains flue gases in the diverter ports from the outside ambient air. Inwardly of the outer casing is a layer of insulation 46 and a liner 48. The insulation and the liner are secured in place by anchors 49 to casing 44.

Seal land 36 is secured directly or indirectly to casing 44 with at least its sealing surfaces 38 and 40 protruding from the surrounding insulation and liner. Considering thermal expansion, the seal land may be installed in short segment lengths with gaps between the ends of adjacent segments. As such, generally a plurality of short segment lengths positioned end to end form the entire length of the seal land and such that the seal land encircles its corresponding port.

Another seal land according to the present invention and some options thereto are shown in FIGS. 3 to 8. The seal land of these Figures is formed of a plurality of seal land segments 132 positioned in end to end relation to form a continuous perimeter seal about a port in a diverter junction. The drawings of FIGS. 3 and 4, for example, show two seal land segments 132 in end to end relation with a gap 154 formed between the ends. The seal land segments form seal land structures 138, 140 that, through the similar form and end to end arrangement of segments 132 become continuous along the length of the seal land. Although only an enlarged portion of the seal land is shown, it is to be understood that the elongate structures forming front sealing surface 138 and rear sealing surface 140 extend substantially continuously about the perimeter of their outlet port to present a seal land against which the leading 130a and trailing 130b blade seals of a diverter damper blade 122 can land and seal. When damper blade 122 is in a sealing position against the seal land, a cavity 142 is formed between the leading blade seal and the rear seal land and the trailing blade seal and the front seal land.

Seal land segments each define structures 138, 140 which are defined as front seal land structure 138 and rear seal land structure 140. Front seal land 138 has a length, an inner edge 138b extending along its length and an outer edge 138c extending along its length and spaced from the outer edge and defines an elongate front sealing surface 138a on its front side between the outer edge and the inner edge. The terms inner and outer are employed here with consideration as to the radial positioning of the parts when they are located in the final configuration of a seal land encircling a flue gas duct. Rear seal land 140 has a length, a base edge 140c extending along its length and an opposite edge 140b extending along its length spaced from the base edge and defines an elongate rear sealing surface 140a on its front side between the base edge and the opposite edge.

In this illustrated embodiment, structures 138, 140 are formed integral with each other on each segment. The base edge 138c of structure 138 is connected directly or indirectly to the casing and the rear seal land structure is installed in the duct only through its connection to the front seal land. As such, rear seal land is free of any direct connection to the duct casing, which eliminates any thermal conduction from the rear seal land 140 directly to the casing.

Each seal land segment may be formed, for example, of a sheet material that forms elongate front seal land structure 138 with front sealing surface 138a on its front face, elongate rear seal land structure 140 with rear sealing surface 140a on its front face and a transition member, herein formed as a region 141 of the sheet material between the front and the rear seal lands. The configuration of front seal land structure 138 and rear seal land structure 140 joined by transition region 141 forms a stepped structure in section with edges 138c and 140b being free of any direct connection to region 144 and free of any direct connection to each other. In the illustrated embodiment, the transition region 141 extends back from the radially inner edge 138b of the front seal land structure to the base 140c of the rear seal land structure. Front seal land structure 138 and rear seal land structure 140 may be spaced apart to correspond to the spacing of the blade seals that are intended to seat thereagainst. In addition, rear seal land structure protrudes radially inwardly beyond the inner edge of front seal land structure 138 to be accessible for presenting a surface to accept and seal leading blade seal 130a. Rear seal land structure may be canted forwardly, to bend slightly over and above transition region 141, such that it can be driven back slightly when the damper seal is driven against it.

The parts of the seal land may be formed integral at substantially each circumferential location such that they can act together with respect to thermal expansion and in response to the application of force. For example, although, as noted, the entire seal land may be formed of a plurality of segment lengths 132 arranged end to end, it is desirable that the front seal land structure, the rear seal land structure and the transition region be formed integral at any particular location, for example along each segment. Front seal land structure 138, rear seal land structure 140 and transition region 141 may be formed integral in various ways, as by bracketed connection, fastener connection, welding, forming of a continuous sheet, etc. In one embodiment, for example, the seal land is formed of a single sheet of elongate metal bent along its length to create the steps forming structures 138, 140 and region 141.

In one embodiment, the seal land may be supported by a system of gussets that are positioned on the rear side of the seal land, i.e. on the side adjacent a back side 138d of structure 138 opposite surface 138a.

The system of gussets may include a plurality of spaced apart gussets 150, 152 mounted to the casing 144. Gussets 150, 152 act behind the seal land to buttress it against the main direction of force encountered when the damper blade seals come to bear thereagainst. The gussets may be in a form to provide seal land support, wherein they are firmly mounted on casing 144 and extend up behind the seal land. In one embodiment, gussets 150, 152 may be formed having plate-like bodies (i.e. with a height and a width each much greater than the thickness T and which clearly define planes along their height and width). Each gusset may be positioned close behind and possibly in contact with the seal land, with the planes defined by the plate-like body running substantially perpendicular to the planes defined by the expanse of face 138a of the seal land. The plate construction of each gusset may be continuous or perforated, as desired. If desired, the gussets may be formed to support the seal land but to allow some flex in it, such flexing being possible and perhaps desirable when the damper blade seals come to bear against the seal land sealing surfaces. At least some of the gussets may, therefore, be positioned and/or shaped to be close behind the seal land but only in contact with it when the seal land assumes its flexed shape.

The gussets are securely fixed to casing 144, as by use of one or more of fasteners, clamps, welding, interlocks, etc. The system of gussets may include at least two types of gussets: middle gussets 150 and end gussets 152. The middle gussets act mainly to support the seal land and fix it in position within its port, while the end gussets provide support, while accommodating and guiding the seal land's thermal growth. For example, the middle gusset fixes and supports the seal land, without constraining thermal growth outwardly from the middle of the segment and end gussets may be configured relative to the seal land to support it, while allowing the seal land to float and slide thereover as it cycles through thermal expansion and retraction. By use of these gussets, the seal land may be properly supported in the flue gas port but able to respond to thermal conditions substantially without warping.

Recalling that the seal land may be installed in short segment lengths 132 positioned end to end with gaps 154 between the ends of adjacent segments, a middle gusset 150 is positioned adjacent a middle portion of a seal land segment 132. In one embodiment, care may be taken to position middle gusset 150 generally centrally between the ends of a seal land segment. This careful positioning may be useful as distance traveled during thermal expansion on either side of the middle gusset might be substantially equal. The middle gusset may be connected, as by use of one or more of fasteners, clamps, welding, interlocks, etc., to the seal land behind which it is positioned. Any such connection may allow some flex between the parts or slight axial movement of the seal land relative to the gusset body, as by use of fastener/slot connections or by use of clamps. Alternately, the connection may be rigid, holding the parts together substantially without an allowance for flex and/or movement thereat.

Middle gusset 150 includes a surface 150a formed to be closely positionable behind back side 138d of structure 138, opposite its sealing surface against which the trailing blade seal bears. In one embodiment, the middle gusset has a perimeter shape on its front edge that substantially follows the stepped configuration of the seal land. For example, the edge defining surface 150a may extend up substantially following the contour of surface 138d along a portion or all of its height and may be formed to extend back under a portion of transition region 141. Gusset 150 may, if desired or to facilitate construction, also follow substantially the curvature along the transition region 141. As noted above, if desired the middle gusset may be formed to support the seal land only after some flex has occurred in it. The front edge surface may, therefore, be positioned and/or shaped to follow the flexed shape of the seal land.

Middle gusset 150 may include a supporting surface extending behind rear seal land structure 140. However, as shown, it is believed that sufficient support may be provided by positioning middle gusset 150 only behind front seal land structure 138 possibly with some amount of body material supporting under transition region 141.

The system of gussets buttressing the seal land may include at least one end gusset 152 between each two spaced middle gussets 150 along the length of the seal land. In particular, in one of its simplest forms, the system of gussets may include an alternating arrangement of one middle gusset and one end gusset followed by one middle gusset and one end gusset, etc. along substantially the entire length of the seal land. In another embodiment, there may be more than one middle gusset between the end gussets in series or more than one end gusset between middle gussets in series. The end gussets support the seal land segment lengths adjacent their ends. In one embodiment, therefore, there are end gussets positioned behind and adjacent each end of each segment length. In one embodiment as shown, one end gusset 152 may operate for two segments 132. For example, in one embodiment as shown, end gusset 152 is positioned adjacent gap 154, and, for example, may be positioned in alignment with the gap, such that one end gusset operates for two segments 132. In one embodiment, for example, the plane defined by end gusset 152, if projected outwardly, may be considered to intersect the gap and, in fact, may intersect substantially centrally along gap 154 between adjacent seal land segment lengths.

The end gussets allow thermal growth of the seal land and therefore are not rigidly secured to the seal land form. In one embodiment for example, end gussets 152 are substantially free from any fixed connection to the seal land segment behind which they act. However, referring to one end gusset for simplicity of discussion, end gusset 152 is positioned adjacent the seal land back side to provide a support against which the seal land can bear but slide over (i.e. for example, when driven by thermal expansion). For example, end gusset 152 includes a surface 152a formed to be closely positionable behind back side 138d of structure 138, opposite its sealing surface 138a against which the trailing blade seal bears. In one embodiment, the end gusset has a perimeter shape on its front edge that substantially follows at least a portion of the shape and configuration of the back side of the seal land. For example, end gusset surface 152a may extend up following the contour of surface 138d along a portion or all of its length and may be formed to extend back under a portion of transition region 141. End gusset 152 may, if desired or to facilitate construction, also follow substantially the curvature along the transition region 141. As noted above, if desired the end gusset may be formed to support the seal land only after some flex has occurred in the seal land. The front edge surface may, therefore, be positioned and/or shaped to follow the flexed shape of the seal land.

To enhance the supporting action of the end gussets, especially when end gusset 152 acts in or adjacent one of gaps 154, the end gusset may have secured thereto an edge strip 156 of metal forming a width-extended seal land support surface. Edge strip 156 may include a strip of material having a length and a width W along a facing surface 156a that is greater than the thickness T of end gusset 152. Edge strip 156 may be secured to the front edge 152a of end gusset 152 to effectively increase the width of the gusset at its supporting surface for seal land. The edge strip is secured along the front edge of the end gusset with its width W extending substantially orthogonal to the plane of the gusset plate body, which is substantially parallel to the planes along the lengths of seal land structures 138, 140. As such, a T-shaped structure is formed in section along the edge of the end gusset to provide a greater available surface area for contact between the end gusset and the seal land behind which it is positioned. The width W of facing surface 156a may be selected to be at least as wide, and possibly wider, than gap 154 in its widest state, which will be when the segment lengths are not experiencing thermal expansion. The strip may act in the same way as surfaces 152a, 152b described above and, for example, may be secured along the gusset's plate body front edge to substantially follow the contour of at least a length of seal land back sides 138d, 140d.

End gusset 152 may include a supporting surface extending behind rear seal land structure 140, if desired. For example, strip 156 may be extended up on the back side 140d of structure 140. This may provide support for the upper end of the seal land and may also serve to provide a structure blocking the opening of gap 154. End gusset 152 may extend higher to support strip 156 behind 140d of structure 140. However, it is believed that sufficient support may be provided by positioning the end gussets only behind front seal land structure 138 possibly with some amount of body material supporting under transition region 141.

As noted above, the gussets are securely fixed to casing 144. As such, the gussets may act as a path for heat to be conducted to casing 144. In one embodiment, therefore, any connections to casing are treated to reduce thermal conduction from the gusset to the casing wall. In one embodiment, for example, the connection can be provided with a heat break, for example a layer of thermally insulating material or a gap, between the gusset and the casing. In one embodiment, the bottom of the gusset can be formed such that there is connection to the casing only at one or more points, as opposed to the whole lower edge being connected to the casing. For example, the lower edge of a gusset may be formed to include a plurality of legs 160 with a recessed area 162 between, which legs provide spaced apart, discrete points through which the gusset may be secured to the casing. The material of the gusset is actually spaced from casing at recessed area 162 such that reduced or possibly substantially no thermal transfer is affected between the gusset and the casing at that area. Securing only the gusset mounting legs 160 provides sufficient strength for the gusset to support the seal land. This combined with the spacing of the gussets reduces the contact points with the casing and controls thermal transfer to the casing.

Figure 5:
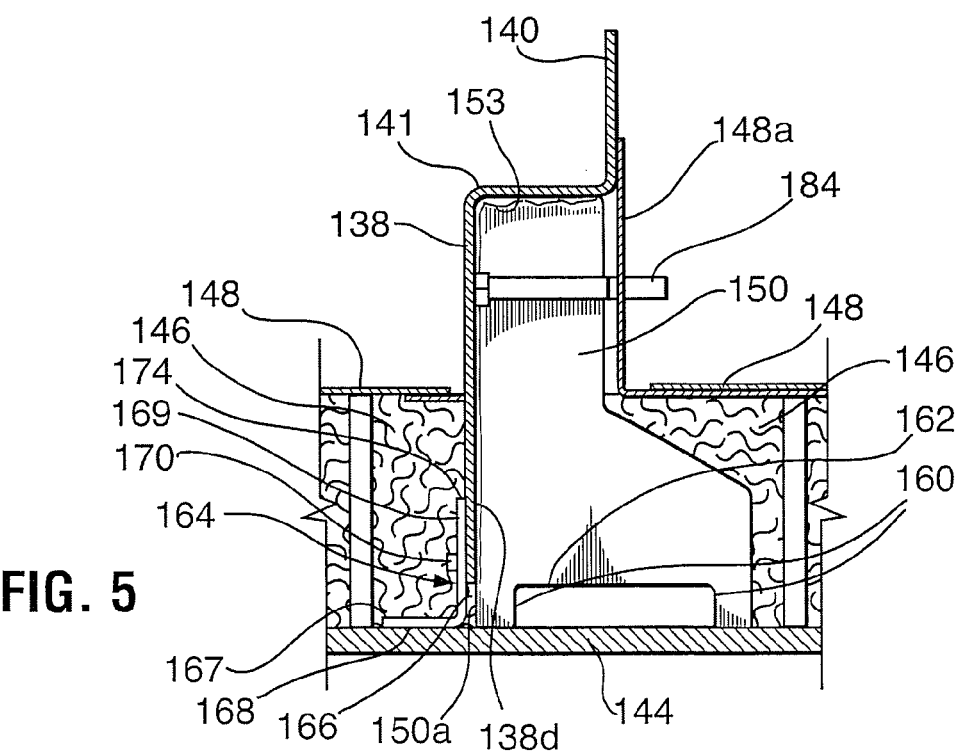
FIG. 5 is a sectional view along line I-I of FIG. 4 with surrounding liner and insulation installed thereabout.
Figure 6:
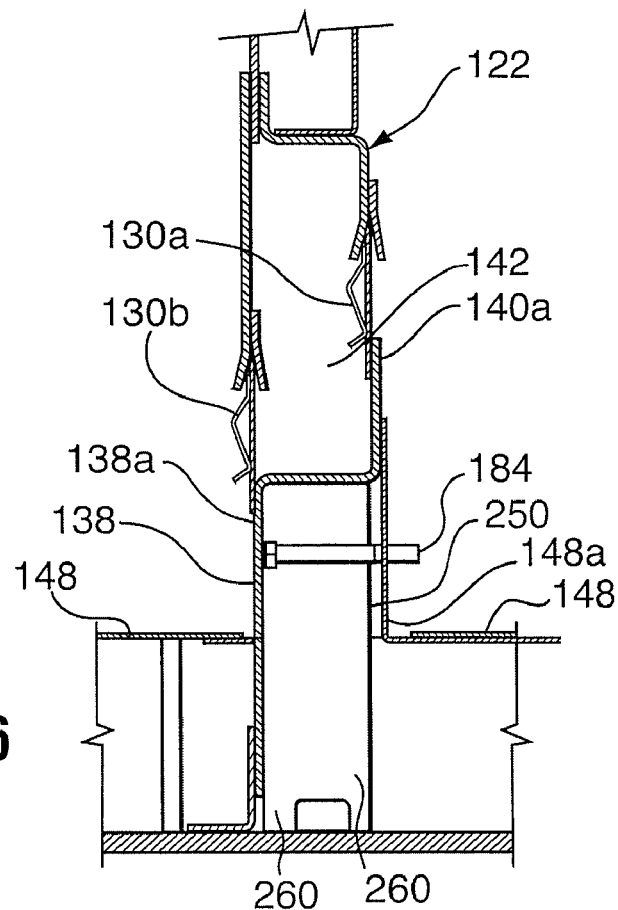
FIG. 6 is a section view corresponding to FIG. 5 with a blade sealed thereagainst.
Figure 7:
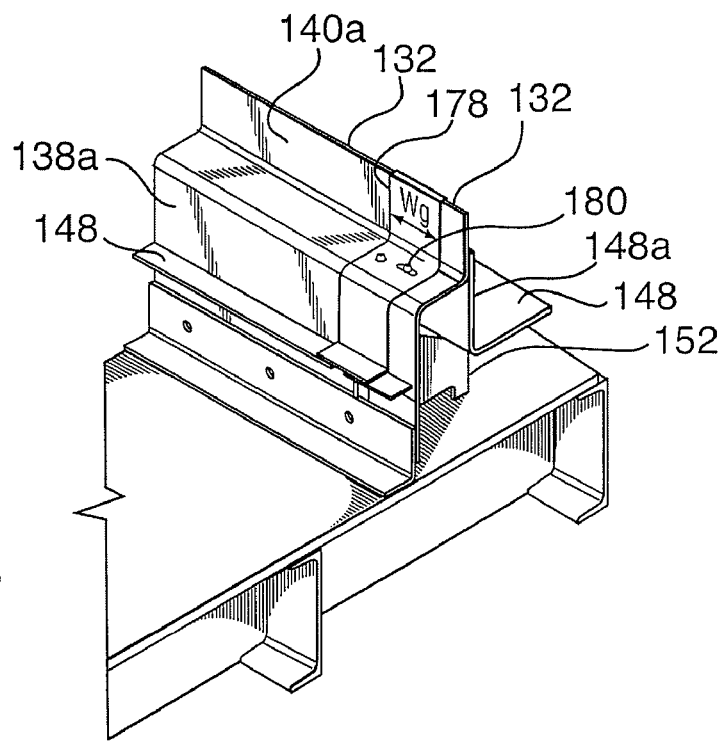
FIG. 7 is front perspective view of a portion of a seal land with a gap seal installed thereon.
Figure 8:
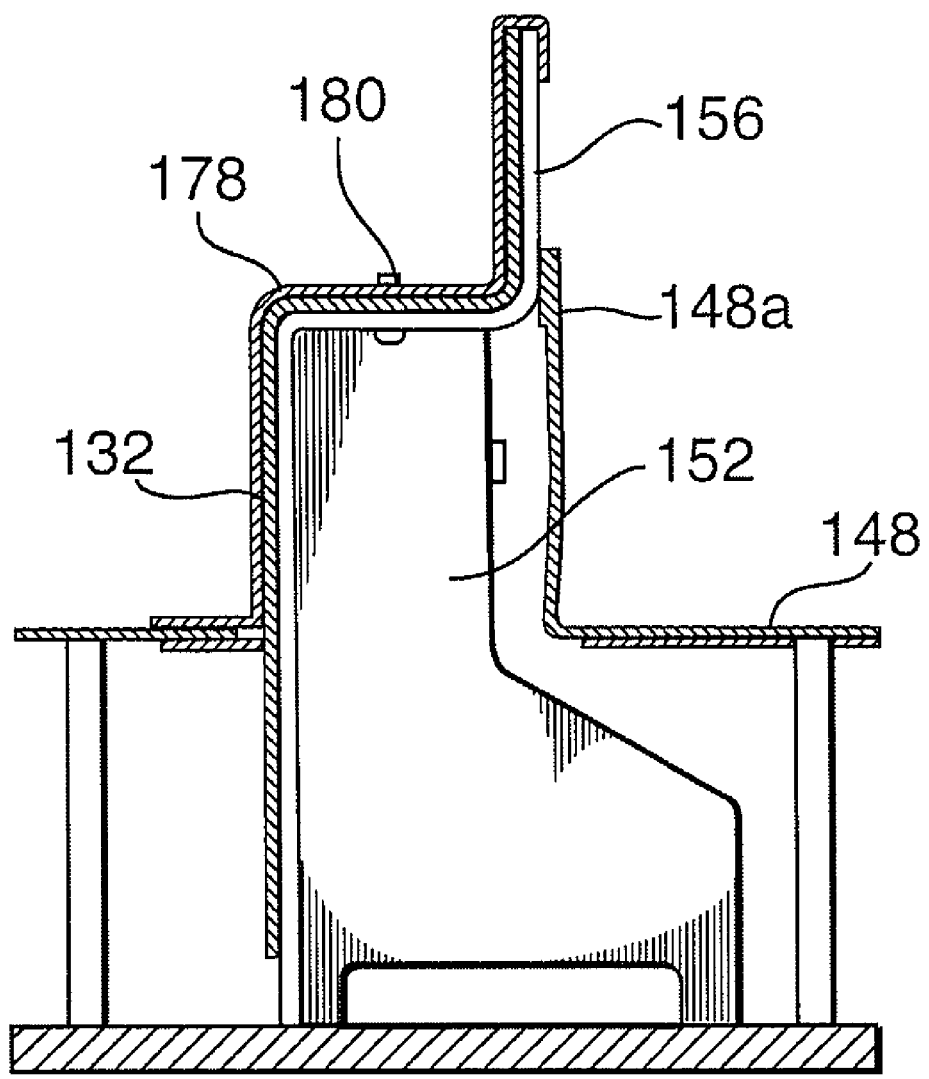
FIG. 8 is a sectional view of the seal land taken along the same section line as the right hand end of FIG. 7.

As shown by comparison of FIGS. 5 and 6, the gussets may be shaped and formed in several ways. For example, while a middle gusset is shown in each view, note that middle gusset 150 of FIG. 5 has a flare like shape, where the width of its base defining legs 160 is flared relative to its upper end and middle gusset 250 of FIG. 6 has a more consistent width along its height. Legs 160 of the flared form may have a greater space therebetween than legs 260 of gusset 250. A flared form may provide greater stability and ability to react force over the non-flared gusset. However, material selection and mounting method may also be factors that can overcome stability issues, if desired.

While the seal land may be supported from behind by gussets, optionally, a retainer 164 may be installed along the interface of the seal land and the casing on the front side of the seal land (i.e. on the same side as surface 138a). Retainer 164 may provide an abutment for the seal land to counteract the cantilever effect, which may be generated in response to forces exerted by the damper blade against the seal land especially at rear seal land structure. Retainer 164 may take various forms and have one or more of many possible anchoring and seal land connection sites. Installation may employ one or more of fasteners, clamps, welding, interlocks, etc. For example, the retainer could be secured beneath or through the seal land to one or more of the gussets. Alternately, the retainer could be secured to the casing in front of the seal land without or with direct or indirect connection to the seal land. Consideration of the thermal expansive properties of the retainer may be useful. For example, any retainer may be installed in segments to more readily accommodate thermal expansion. If the retainer is connected to any parts, allowance may be given to address thermal expansion of the retainer. For example, the retainer may be connected by brackets, fastener/slot connections, etc.

The retainer may also be formed, if desired, to substantially block any gap 166 between seal land segments 133 and casing 144, which gap might operate as a leak path for flue gases. Retainer 164, for example, may be positioned and/or formed to span gap 166. In one embodiment, for example, the retainer can be formed to include a material extension spanning any gap 166.

In the illustrated embodiment, retainer 164 takes the form of an angle support having one arm 167 that is connected at 168 to casing 144 by welding and a second arm 169 that is connected by fasteners 170 secured in apertures and/or slots 172 formed in the retainer and adjacent the lower edge of seal land segments 132 and/or edge strip 156. In order to seek to control and resist thermal conduction to casing 144, various measures may be taken. For example, arm 169 may be height limited to maintain it protected below the upper level of insulation 148. Alternately or in addition, a heat break 174 may be installed between the casing and the retainer and/or, as shown, between the retainer and the seal land.

Also, with respect to addressing, if desired, leak paths that may occur between the blade seals and the seal land, a front gap seal 178 (FIGS. 7 and 8) may be positioned to cover the front side of gap 154. If it is found that flue gases leak between the blade seals and the sealing surfaces 138*a* and/or 140*a*, a gap seal 178 may be installed to seal the gap, while continuing to allow thermal expansion between the parts. For example, in one embodiment, the gap seal may employ a strip that substantially follows the contour of the seal land across at least surfaces 138*a*, 140*a* and is positioned on the front side of the seal land. Gap seal 178 has a width Wg selected to be at least as wide, and possibly wider, than gap 154 in its widest state, which will be when the segment lengths are not experiencing any thermal expansion. Gap seal 178 has a material thickness less than that of the material forming the seal land segments such that any step created from gap seal 178 to the sealing surfaces 138*a*, 138*b* does, not itself create a more problematic leak path. Gap seal 178 can be installed in various ways to the seal land, without hindering thermal expansion at the gap. For example, the strip can be rigidly secured to one seal land segment while spanning the gap and being free of a connection to the adjacent segment. Alternately or in addition, fastener/slot connections 180 can be used and/or gap seal 178 may be secured by other parts such as by clamping between the retainer and the seal land and/or folding, as shown at 182, over the upper edge of the seal land. If gap seal 178 is used and end gusset 152 is positioned at gap 154, the seal land will be sandwiched between the end gusset and the front gap seal and the seal land can slide between these parts, when driven by thermal expansion.

The insulation 146 and liner 148 can be installed in about the seal land, as is usual. If desired, the liner can include an extension 148*a* extended up to protect the back side of the seal land. Bolts 184 can be secured to hold extension 148*a* if desired.

The materials and methods of manufacture and installation of the seal land, as will be appreciated, must be selected to reasonable withstand and operate suitably in the rigors of a flue gas duct. As such, materials such as steel, including alloy, treated and stainless forms thereof, may be particularly useful. Dimensions of segments 132 may be selected to facilitate handling and installation, while being durable and useful. Seal land segments with thicknesses of ¼ to 1 inch and lengths of 2 to 6 feet are envisioned, but of course this can vary depending on the size of the duct, materials, forming methods, conditions of use, etc. Gap 154 should be selected with consideration as to the thermal expansive properties of the seal land material. Gaps during full thermal expansion of no less than ⅛ inch or ¼ inch may be particularly useful. Of course, many of the selections with respect to materials and dimensions can vary widely depending on conditions of use, availability, methods, etc.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A diverter damper seal land for installation in a flue gas duct defined by a casing wall, the diverter damper seal land comprising:
   a front seal land having a length, an outer edge extending along its length and an inner edge extending along its length spaced from the outer edge and defining an elongate front sealing surface on its front side between the outer edge and the inner edge; and
   a rear seal land having a length, a base edge extending along its length and an opposite edge extending along its length spaced from the base edge and defining an elongate rear sealing surface on its front side between the base edge and the opposite edge,
   the front seal land mountable in the duct by a connection between the outer edge and the casing wall and the front seal land and the rear seal land being formed of a single sheet of material bent such that the rear seal land extends at its base edge from the inner edge of the front seal land and the rear seal land is spaced back and radially inwardly from the front seal land such that the rear seal land protrudes radially inwardly behind the front seal land.

2. The diverter damper seal land of claim 1 wherein the single sheet of material further comprises a transition member connected to the inner edge and extending between the inner edge and the base edge.

3. The diverter damper seal land of claim 1 formed in a plurality of segments formed end to end.

4. The diverter damper seal land of claim 1 wherein the seal land forms a stepped structure in section.

5. The diverter damper seal land of claim 1 wherein the rear seal land is free of any direct connection to the casing wall.

6. A diverter damper seal land assembly for installation in a flue gas duct defined by a casing wall, the diverter damper seal land comprising:
- a seal land including a single sheet of metal bent to define:
  - a front seal land having a length, an outer edge extending along its length and an inner edge extending along its length spaced from the outer edge and defining an elongate front sealing surface on its front side between the outer edge and the inner edge, the front seal land mountable in the duct by a connection to the casing wall; and
  - a rear seal land having a length, a base edge extending along its length and an opposite edge extending along its length spaced from the base edge and defining an elongate rear sealing surface on its front side between the base edge and the opposite edge, the rear seal land extending at its base edge from the inner edge of the front seal land and spaced back and radially inwardly from the front seal land such that the rear seal land protrudes radially inwardly behind the front seal land; and
- a connector for connecting the front seal land to the casing wall.

7. The diverter damper seal land assembly of claim 6 wherein the single sheet of material further defines a transition member extending between the inner edge and the base edge.

8. The diverter damper seal land assembly of claim 6 formed in a plurality of segments formed end to end.

9. The diverter damper seal land assembly of claim 6 wherein the connector includes a gusset including a plate like body extending substantially perpendicular to the length of the seal land and connected to the casing wall and the seal land.

10. The diverter damper seal land assembly of claim 6 wherein the seal land forms a stepped structure in section.

11. The diverter damper seal land assembly of claim 6 wherein the rear seal land is free of any direct connection to the casing wall.

12. A diverter damper seal land assembly for installation in a flue gas duct defined by a casing wall, the diverter damper seal land comprising:
- a seal land including:
  - a front seal land having a length, an outer edge extending along its length and an inner edge extending along its length spaced from the outer edge and defining an elongate front sealing surface on its front side between the outer edge and the inner edge; and
  - a rear seal land having a length, a base edge extending along its length and an opposite edge extending along its length spaced from the base edge and defining an elongate rear sealing surface on its front side between the base edge and the opposite edge,
  - the front seal land mountable in the duct by a connection to the casing wall and the rear seal land being connected at its base edge to the inner edge of the front seal land and spaced back and radially inwardly from the front seal such that the rear seal land protrudes radially inwardly behind the front seal land; and
- a connector for connecting the front seal land to the casing wall, the connector including a gusset including a plate like body extending substantially perpendicular to the length of the seal land and connected to the casing wall and the seal land.

* * * * *